(12) United States Patent
Vardhan

(10) Patent No.: US 10,853,683 B2
(45) Date of Patent: Dec. 1, 2020

(54) SYSTEMS AND METHODS TO DETERMINE SIZE AND COLOR OF A FASHION APPAREL

(71) Applicant: Myntra Designs Private Limited, Bangalore (IN)

(72) Inventor: Makkapati Vishnu Vardhan, Bangalore (IN)

(73) Assignee: MYNTRA DESIGNS PRIVATE LIMITED, Bangalore (IN)

( * ) Notice: Subject to any disclaimer, the term of this patent is extended or adjusted under 35 U.S.C. 154(b) by 55 days.

(21) Appl. No.: 16/123,428

(22) Filed: Sep. 6, 2018

(65) Prior Publication Data

US 2019/0073556 A1    Mar. 7, 2019

(51) Int. Cl.
| | | |
|---|---|---|
| *G06K 9/46* | (2006.01) | |
| *G06T 7/90* | (2017.01) | |
| *G06T 7/60* | (2017.01) | |
| *G06T 7/73* | (2017.01) | |
| *G06T 7/564* | (2017.01) | |
| *G06K 9/48* | (2006.01) | |
| *G06K 9/32* | (2006.01) | |

(52) U.S. Cl.
CPC ......... *G06K 9/4604* (2013.01); *G06K 9/3216* (2013.01); *G06K 9/4652* (2013.01); *G06K 9/48* (2013.01); *G06T 7/564* (2017.01); *G06T 7/60* (2013.01); *G06T 7/73* (2017.01); *G06T 7/90* (2017.01); *G06K 2009/3225* (2013.01); *G06T 2207/10024* (2013.01); *G06T 2207/30124* (2013.01); *G06T 2207/30204* (2013.01); *G06T 2207/30208* (2013.01)

(58) Field of Classification Search
CPC .. G06K 9/3216; G06K 9/4604; G06K 9/4652; G06K 9/48; G06K 2009/3225; G06T 7/564; G06T 7/60; G06T 7/73; G06T 7/90; G06T 2207/10024; G06T 2207/30124; G06T 2207/30204; G06T 2207/30208
See application file for complete search history.

(56) References Cited

U.S. PATENT DOCUMENTS

| | | | | |
|---|---|---|---|---|
| 7,184,585 | B2 * | 2/2007 | Hamza | G06K 9/00771 |
| | | | | 348/135 |
| 8,712,163 | B1 * | 4/2014 | Osheroff | G06K 9/00 |
| | | | | 382/149 |
| 9,230,326 | B1 * | 1/2016 | Liu | G06T 7/80 |
| 9,578,295 | B1 * | 2/2017 | Morrison | H04N 9/3185 |
| 9,696,897 | B2 * | 7/2017 | Garcia | G01B 11/02 |

(Continued)

*Primary Examiner* — Katrina R Fujita
(74) *Attorney, Agent, or Firm* — Harness, Dickey & Pierce, P.L.C.

(57) ABSTRACT

An image processing system and method for determining one or more attributes of a fashion apparel is provided. The system includes a pattern template. The pattern template further includes a plurality of patterns and the fashion apparel is positioned on top of the patterned template. The system further includes an imaging device configured to capture an image of the fashion apparel positioned on top of the pattern template. In addition, the system includes a size and color determination module coupled to the imaging sensor and configured to receive the image and extract a size and a color of the fashion apparel by using the plurality of patterns in the pattern template.

19 Claims, 5 Drawing Sheets

(56) References Cited

U.S. PATENT DOCUMENTS

| | | | |
|---|---|---|---|
| 2010/0067738 A1* | 3/2010 | Petricoin, Jr. | G06T 7/73 382/103 |
| 2014/0204200 A1* | 7/2014 | Suddamalla | H04N 17/002 348/92 |
| 2017/0255648 A1* | 9/2017 | Dube | G06F 16/583 |

* cited by examiner

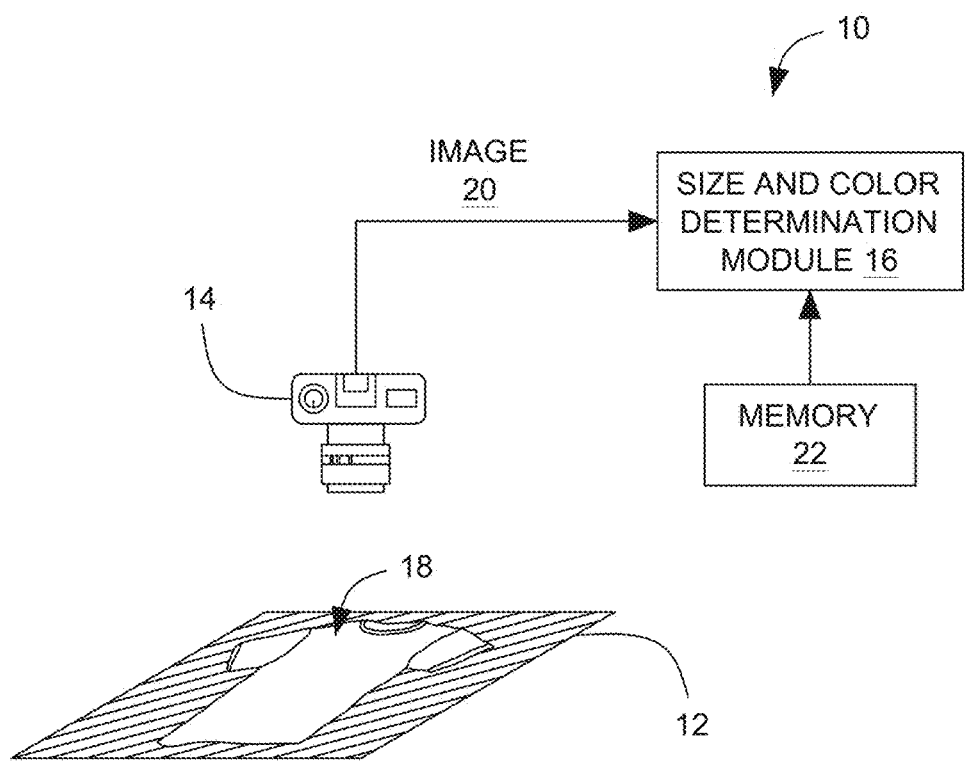
FIG. 1
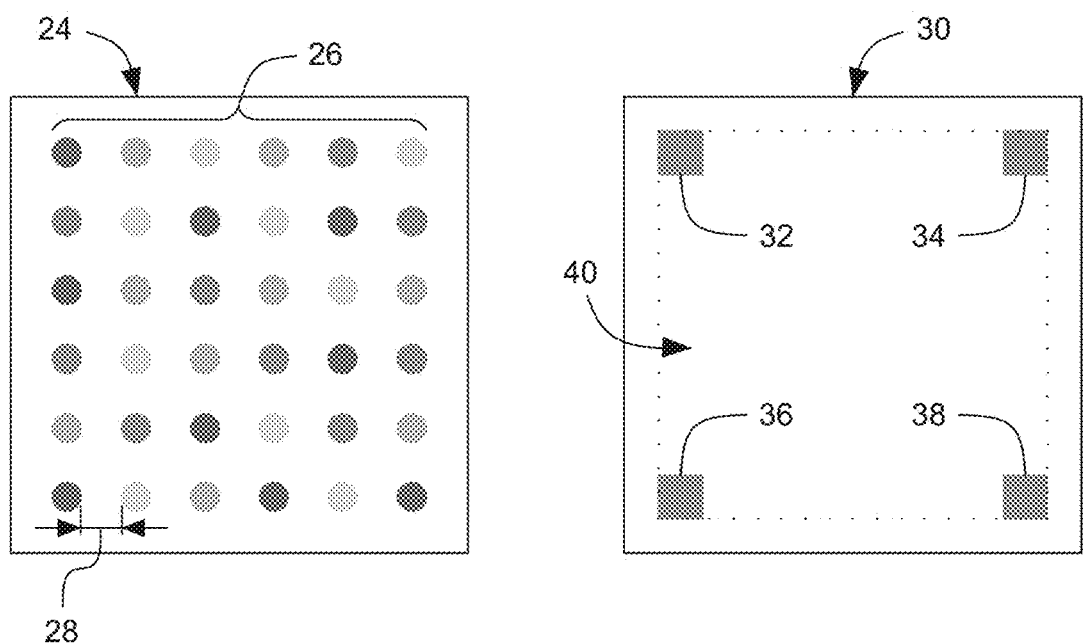
FIG. 2-A    FIG. 2-B

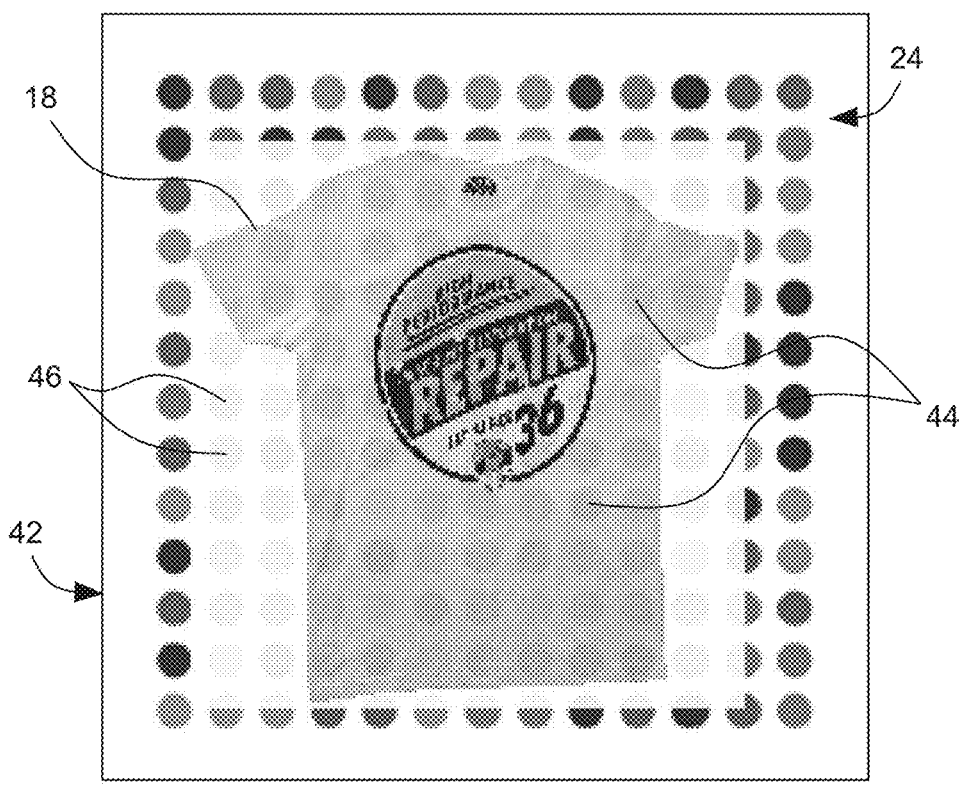
FIG. 3-A
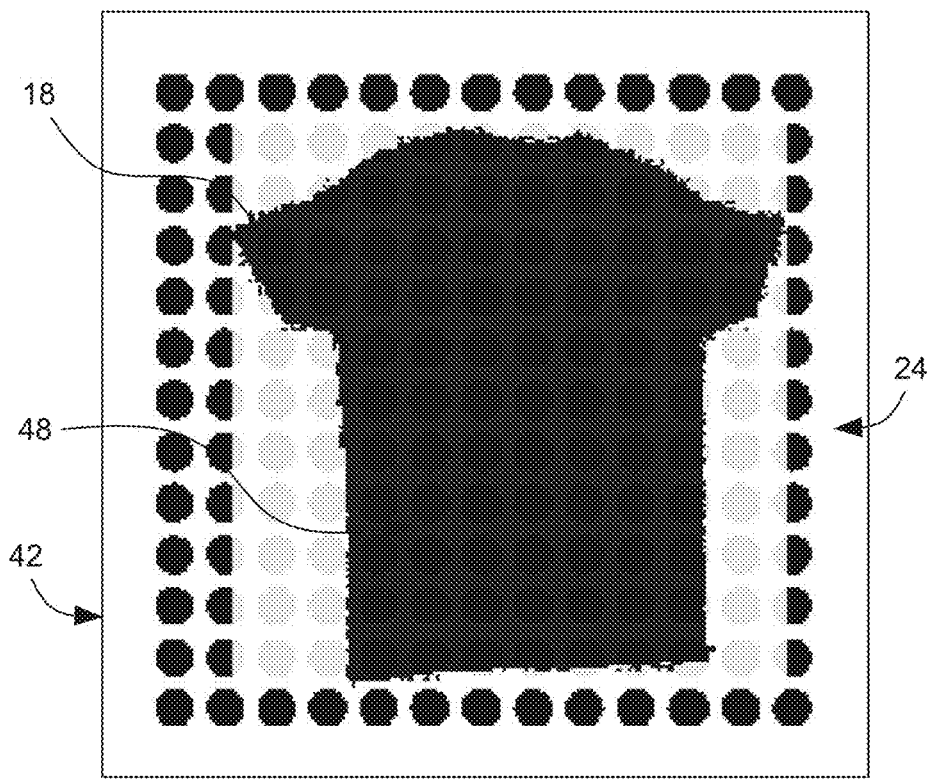
FIG. 3-B

FIG. 5-A
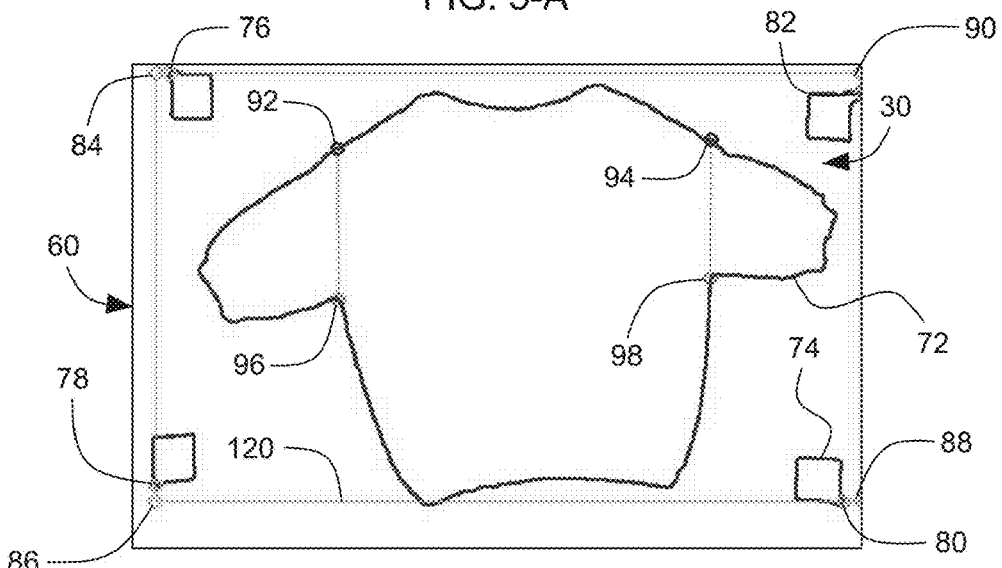
FIG. 5-B
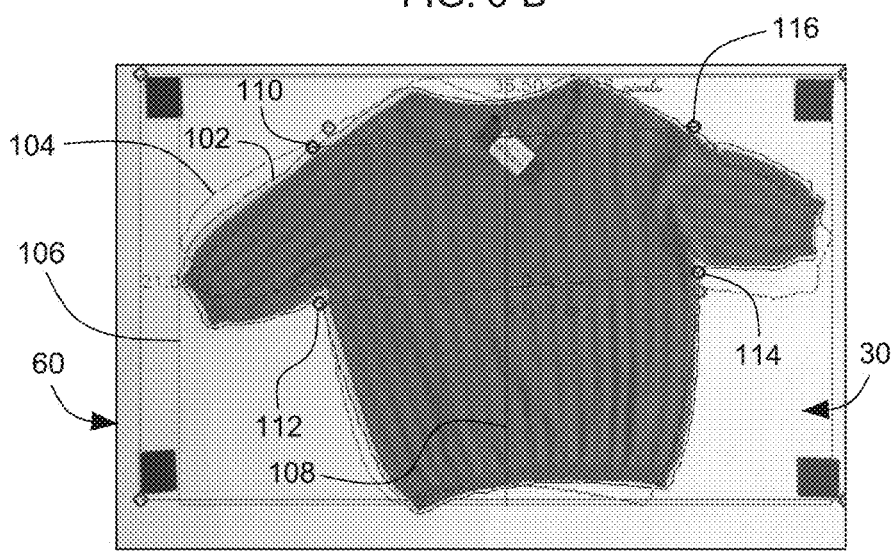
FIG. 5-C

SYSTEMS AND METHODS TO DETERMINE SIZE AND COLOR OF A FASHION APPAREL

PRIORITY STATEMENT

The present application claims priority under 35 U.S.C. § 119 to Indian patent application number 201741031709, filed 7 Sep. 2017, the entire contents of which are hereby incorporated herein by reference.

FIELD

The invention relates generally to e-commerce platforms and more particularly to a system and method for determining size and color of apparels marketed on an e-commerce platform.

BACKGROUND

Online customer decision making process is influenced by various social, cultural and personal factors. Online retailers are consistently working on improving customer's online shopping experiences by enabling ways to find the right product which in turn could positively impact customer's overall experience.

In case of fashion apparels, size and color are two of most important parameters based on which customers purchase products on e-commerce platforms and thus may hugely impact the conversion rates. Marketing correct size for customers has been challenging for online retailers as the nomenclature and size charts indicating size of the product varies across various brands. Typically, sizes of apparels are manually determined and thus is a labor-intensive process.

Similarly, existing e-commerce platforms tag the color of an apparel by manually checking the original item. However, there is a possibility that the exact color of the apparel may not be captured and displayed correctly. For example, due to the ambient illumination, the color identified may differ from the actual color of the apparel.

Therefore, there is a possibility that the size and color of a particular apparel marketed on an e-commerce platform may not be displayed accurately. This may lead to high return and exchange rates which in turn deeply affects the conversion.

Thus, there is a need to determine the accurate size and the original color of the fashion apparel to ensure customer satisfaction and generate successful purchases.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide system and method to determine size and color of a fashion apparel.

Briefly, according to an example embodiment, an image processing system for determining one or more attributes of a fashion apparel is provided. The system includes a pattern template. The pattern template further includes a plurality of patterns and the fashion apparel is positioned on top of the patterned template. The system further includes an imaging device configured to capture an image of the fashion apparel positioned on top of the pattern template. In addition, the system includes a size and color determination module coupled to the imaging sensor and configured to receive the image and extract a size and a color of the fashion apparel by using the plurality of patterns in the pattern template.

According to another example embodiment, a method for determining one or more attributes of a fashion apparel is provided. The method includes positioning a fashion apparel on top of a pattern template. The pattern template includes a plurality of patterns. The method further includes capturing an image of the fashion apparel positioned on top of the pattern template. In addition, the method includes extracting a size and a color of the fashion apparel by using the plurality of patterns in the pattern template.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIG. 1 is a block diagram illustrating an image processing system configured to determine a size and a color of a fashion apparel, implemented according to the aspects of the present technique;

FIG. 2-A illustrates an example of a first arrangement of a pattern template, implemented according to the aspects of the present technique;

FIG. 2-B, illustrates an example of a second arrangement of a pattern template, implemented according to the aspects of the present technique;

FIG. 3-A and FIG. 3-B illustrate the images corresponding to a first arrangement of a pattern template, implemented according to the aspects of the present technique;

FIG. 5-A through 5-C illustrate a method to determine size of a fashion apparel using a second arrangement of a pattern template, implemented according to the aspects of the present technique.

DETAILED DESCRIPTION OF EXAMPLE EMBODIMENTS

Figure 4:
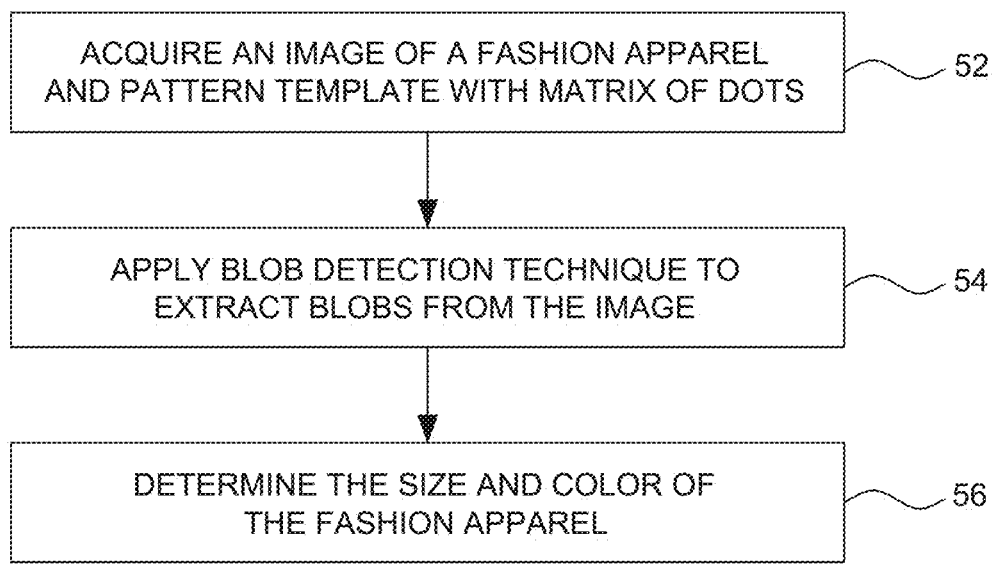
FIG. 4 is a flowchart illustrating a method to determine size and color of a fashion apparel using a first arrangement of a pattern template, implemented according to the aspects of the present technique.
Figure 6:
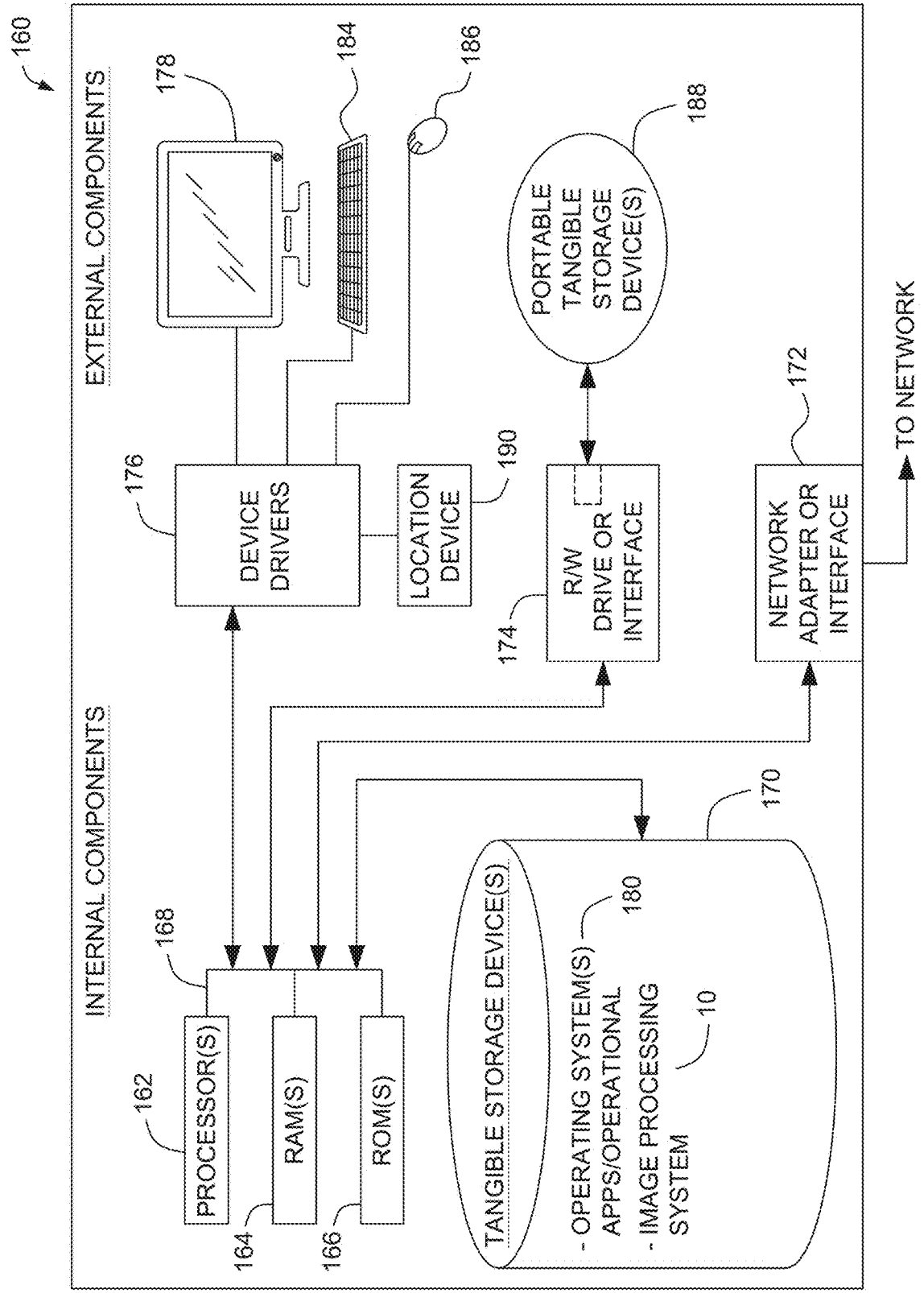
FIG. 6 is a block diagram of an embodiment of a computing device in which the modules of the image processing system, described herein, are implemented.

Example embodiments of the present technique provide an image processing system and method for determining size and color of fashion apparels marketed on an e-commerce platform.

FIG. 1 is a block diagram illustrating an image processing system configured to determine a size and a color of a fashion apparel, according to the aspects of the present technique. The image processing system 10 includes a pattern template 12, an imaging device 14 and a size and colour determination module 16. A fashion product 18 is disposed on the pattern template 12 as shown. As used herein, fashion apparel 18 may refer to garments such as tops, shirts, pants, dresses and the like. The manner in which the image processing system 10 operates is described in further detail below.

Pattern template 12 is a flat sheet-like structure which includes one or more patterns imprinted therein. In operation, the pattern template 12 is placed on a flat surface against a light-coloured background. Fashion apparel 18 is then positioned on top of the pattern template 12.

Imaging device 14 is configured to capture an image 20 of an arrangement of the fashion apparel 18 disposed on top of pattern template 12. In one embodiment, the imaging device 14 is mounted and positioned approximately orthogonal to a plane of the pattern template 12. Image 20 captured by the imaging device 14 includes a top view image representation of the fashion apparel 18 and the pattern template 12. In one embodiment, image 20 corresponds to a first arrangement of the fashion apparel 18 placed on the pattern template 12 comprising the matrix of dots. In a second embodiment, the image 20 corresponds to a second arrangement of the fashion apparel 18 placed on the pattern template 12 having markers.

Size and color determination module 16 is coupled to the imaging device 14 and is configured to receive the image 20. Size and color determination module 16 is configured to extract a size of the fashion apparel 18 from the image 20. In one embodiment, a blob detection technique is applied to extract a blob from the image 20, which is then used to determine a size of the fashion apparel 18. In another embodiment, a plurality of contour points is extracted from the image 20. The contour points are then used to compute a size of the fashion apparel 18.

Size and color determination module 16 is further configured to determine a color of the fashion apparel 18. In one embodiment, a transformation from the original colors to observed colors in the pattern template is used to determine the color of the fashion apparel 18. It may be noted that the images 20 of the fashion apparels 18 captured by the imaging device 14 may be stored in a memory 22 of the image processing system 10.

As described above the pattern template may have patterns imprinted therein. These patterns are used by the size and color determination module to calculate the size and/or color of the fashion apparel. In one embodiment, the pattern template 24 comprises a matrix of dots 26 with a fixed spacing 28 between them as shown in FIG. 2-A. Each dot is of a pre-defined size and a pre-defined color. Also, the matrix of dots 26 include various colors from the visible spectrum of colors. The resolution and spacing between the dots may be selected based on multiple parameters such as resolution and focal length of the imaging device 14, the distance between the imaging device 14 and the pattern template 24, and the like. In operation, the fashion apparel (not shown) is disposed on the matrix of dots 26 to form a first arrangement.

In another embodiment, the pattern template 30 comprises one or more markers disposed at pre-defined positions on the pattern template as shown in FIG. 2-B. For example, four markers 32, 34, 36 and 38 are positioned at the four corners of the pattern template 30. It should be noted that, the markers may be of varying colors or one fixed color. In operation, fashion apparel is disposed in an area 40 enclosed by the four markers to form a second arrangement. The manner in which the size and the color of the fashion apparel is determined using first and second arrangement of pattern template, is described in detail in FIG. 3 through FIG. 5-C below.

FIG. 3-A illustrates an example image corresponding to a first arrangement of a pattern template, implemented according to the aspects of the present technique. The fashion apparel 18 is positioned on top of a pattern template 24 and is referred as the first arrangement. In this embodiment, an image 42 of the first arrangement of the pattern template 24 includes a set of occluded dots 44 and a set of visible dots 46 and the fashion apparel 18. As described earlier, a set of blobs are extracted from the image 42 of the pattern template 24 and the fashion apparel 18 using a blob detection technique. Example illustration is given in FIG. 3-B. The set of visible dots with connected pixels form a blob. Further, a blob with the largest area is identified in the received image which corresponds to the fashion apparel. For example, the blob 48 corresponding to the fashion apparel 18 is extracted from the image 42. The manner in which the size and color is determined is described below.

FIG. 4 is a flowchart illustrating a method to determine size and color of a fashion apparel from an image corresponding to a first arrangement, implemented according to various aspects of the present technique. In this embodiment, the pattern template includes a matrix of dots (shown in FIG. 2-A) is used for measuring a size of the fashion apparel. Each step is described in further detail below.

At step 52, an image of the pattern template and the fashion apparel is acquired from the imaging device. It may be noted that upon positioning the fashion apparel, some dots are occluded while others remain visible, as shown in FIG. 3-A. The image includes a set of occluded dots 44 and a set of visible dots 46 and the fashion apparel 18.

At step 54, a blob detection technique is applied to extract blobs from the image. In this embodiment, a unique label is assigned to every pixel in the image such that pixels with the same label share certain characteristics (e.g., color) and are connected. For example, as shown in FIG. 3-B, the set of occluded dots 44 are each assigned a unique label and a set of visible dots 46 are also each assigned a unique label. Further, a blob with the largest area is identified in the received image which corresponds to the fashion apparel. FIG. 3-B illustrates a blob 48 extracted from the image 42.

At step 56, the size and color of the fashion apparel is determined. In one embodiment, the occluded dots 44 in each row or column within the identified blob 48 are used to determine the size of the fashion apparel 18. For example, the number of dots present in the blob and the pre-defined spacing between each dot is used to determine the size of the fashion apparel 18.

Further, the visible dots 46 in the image 42 are used to determine the color of the fashion product based upon a color transform technique. In this embodiment, a transformation from the original colors to the observed colors for the visible dots in the pattern template is determined. For example, in the given illustrated example, if (Roi, Goi, Boi) and (Rai, Gai, Bai) are the observed and actual colors of the ith dot respectively, then $$(Roi, Goi, Boi) = \text{function}(Rai, Gai, Bai) \quad \text{Equation (1)}$$

for i∈[0, M] where M is the number of visible dots;
The function given in Equation (1) is estimated as a matrix. The function is further inverted as represented by Equation (2) below:

$$(Rai, Gai, Bai) = \text{function}_{inverse}(Roi, Goi, Boi) \quad \text{Equation (2)}$$

In an embodiment, the inverse function is applied to all the pixels in the blob 48 corresponding to the fashion apparel 18 and the color of the fashion apparel 18 is determined.

As described earlier, the size of the fashion apparel may also be determined using second arrangement of the pattern template. The manner in which the size of the fashion apparel 18 is determined using the image of second arrangement of pattern template 30, is described in FIGS. 5-A through 5-C below.

FIG. 5-A is an image corresponding to a second arrangement of a pattern template, implemented according to the aspects of the present technique. In this embodiment, an image 60 corresponding to the second arrangement of the pattern template 30 includes one or more markers disposed at pre-defined positions. In one embodiment, four markers 32, 34, 36 and 38 are positioned at the four corners of the pattern template 30. Fashion apparel 18 is then positioned on top of the pattern template 30 within the area enclosed by the four markers 32, 34, 36 and 38.

In an embodiment, the markers 32, 34, 36, 38 and the fashion apparel 18 are segmented as illustrated in the FIG. 5-B. In one embodiment, the image 60 is converted from color to grayscale. In a further embodiment, the local variance in the grayscale image in a window size of n×n (typically about 5×5 pixels) is computed for all the pixels in the image 60. It may be noted that the background is plain (texture less) in contrast to the fashion apparel and markers and the local variance for the fashion apparel 18 and markers is higher than that of the plain background. Further, in an embodiment, a threshold is obtained in local variance to determine the pixels corresponding to the markers 32, 34, 36, 38 and the fashion apparel 18. Further, the segmented markers and the fashion apparel 18 are given unique labels and the contours of them are obtained.

In one embodiment, the outer contour of the markers and the fashion apparel 18 is generated using contour tracing techniques. Examples of the contour tracing techniques include Square Tracing Algorithm, Moore-Neighbor Tracing, Radial sweep, and the like. In the illustrated embodiment, a plurality of contours is determined and the one with maximum area is designated as the fashion apparel contour 72. The remaining four contours 74 correspond to the markers 32, 34, 36, 38 and outermost contour points of them are determined 76, 78, 80 and 82. In addition, the centroid of all the contour points belonging to the contours of the four markers 32, 34, 36, 38 is calculated. The contour points 76, 78, 80, 82 on the four marker contours that are farthest apart from the centroid are designated as the outermost contour points. Instead of using the centroid of the contour points of the markers, the center of the image can also be used.

In a further embodiment, the markers and the image 60 are aligned. In an embodiment, the outermost contour points are aligned to form the corners of the enclosed polygon. For example, the outermost contour points 76, 78, 80, 82 are aligned so that they form the four corners of a rectangle 120. In this embodiment, the coordinates of the minimum bounding rectangle 120 as referenced by 84, 86, 88 and 90 that encompasses all contour points are determined. Further, a homography matrix is used to transform outermost contour points 76, 78, 80, 82 to minimum bounding rectangle 120 with coordinates 84, 86, 88 and 90. Similarly, all the pixels in the image 60 are transformed to the correct alignment using the homography matrix.

It may be noted that the distance between the markers along x-axis (and y-axis) is known in real world coordinates and the number of pixels is also readily available. Hence the distance divided by the number of pixels will give the real-world measurement of each pixel. In another embodiment, given the (x, y) coordinates of any two pixels, the Euclidean distance between them can be calculated and then multiplied by the measurement value per pixel to get the real-world distance between them.

FIG. 5-C illustrates an example image used to determine the length of the fashion apparel 18. In an embodiment, the fashion apparel 18 is first aligned with the markers. Further, the fashion apparel 18 is placed at an angle to the horizontal lines joining the markers. In an embodiment, contour 102 of the fashion apparel is rotated to form contour 104 so that it is parallel to the horizontal lines joining the markers. For example, the chest points 112 and 114 are used as a reference for rotation. The angle between the chest measurement line and the horizontal line is computed. The contour 102 is rotated in the clockwise direction to correct for the misalignment, leading to the aligned contour 104. The minimum bounding rectangle 106 of the aligned contour is calculated and the height (represented by reference numeral 108) of it is taken as the length of the fashion apparel 18. Instead of rotating the apparel, the rotated minimum bounding rectangle of it can also be calculated and the length of it can be taken as that of the apparel.

In a further embodiment, measurements between designated contour points on the fashion apparel 18 are determined. These contour points may be determined manually or via an automated method. For example, if the chest width of the fashion apparel 18 is to be determined, the two contour points that correspond to the measurement is identified on the contour of the fashion apparel 18. In this example embodiment, the contour points 110, 112, 114 and 116 are identified manually or automatically via an algorithm. Further, the Euclidean distance between the (x, y) coordinates of them is calculated and multiplied by measurement value per pixel to get the chest and shoulder measurements.

The proposed technique may be used to obtain accurate size measurements for the fashion apparels as well as retrieve its original color. In addition, the contours obtained, are further used to compare the size of various fashion apparels.

The modules of the image processing system 10 described herein are implemented in computing devices. One example of a computing device 160 is described below in FIG. 7. The computing device includes one or more processor 162, one or more computer-readable RAMs 164 and one or more computer-readable ROMs 166 on one or more buses 168. Further, computing device 160 includes a tangible storage device 80 that may be used to execute operating systems 180 and the image processing system 10. The various modules of the image processing system 10 includes a pattern template 12, an imaging device 14 and a size and color determination module 16. Both, the operating system 90 and the system 10 are executed by processor 162 via one or more respective RAMs 164 (which typically include cache memory). The execution of the operating system 90 and/or the system 10 by the processor 162, configures the processor 162 as a special purpose processor configured to carry out the functionalities of the operation system 180 and/or the image processing system 10 as described above.

Examples of storage devices 170 include semiconductor storage devices such as ROM 166, EPROM, flash memory or any other computer-readable tangible storage device that may store a computer program and digital information.

Computing device also includes a R/W drive or interface 174 to read from and write to one or more portable computer-readable tangible storage devices 188 such as a CD-ROM, DVD, memory stick or semiconductor storage device. Further, network adapters or interfaces 172 such as a TCP/IP adapter cards, wireless Wi-Fi interface cards, or 3G or 4G wireless interface cards or other wired or wireless communication links are also included in computing device.

In one example embodiment, the image processing system 10 which includes a pattern template 12, an imaging device 14 and a size and color determination module 16, may be stored in tangible storage device 170 and may be downloaded from an external computer via a network (for example, the Internet, a local area network or other, wide area network) and network adapter or interface 172.

Computing device further includes device drivers 176 to interface with input and output devices. The input and output devices may include a computer display monitor 178, a keyboard 184, a keypad, a touch screen, a computer mouse 186, and/or some other suitable input device.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An image processing system for determining one or more attributes of a fashion apparel, the system comprising:
    a pattern template comprising a plurality of patterns; wherein the fashion apparel is positioned on top of the patterned template;
    an imaging device configured to capture an image of the fashion apparel positioned on top of the pattern template;
    a size and color determination module coupled to the imaging sensor and configured to receive the image and extract a size and a color of the fashion apparel by using the plurality of patterns in the pattern template.

2. The image processing system of claim 1, wherein the plurality of pattern comprises a matrix of dots; wherein each dot is of a pre-defined size.

3. The image processing system of claim 2, wherein each dot in the matrix of dots is of a pre-defined color.

4. The image processing system of claim 2, wherein the fashion apparel is positioned above the matrix of dots and the imaging device is configured to capture the first pattern image of a first arrangement, wherein first pattern image comprises a set of occluded dots and a set of visible dots.

5. The image processing system of claim 4, wherein the set of occluded dots is used to determine a size of the fashion apparel.

6. The image processing system of claim 4, wherein the set of visible dots is used to determine a color of the fashion apparel.

7. The image processing system of claim 1, wherein the plurality of patterns comprises at least four markers, wherein each marker is disposed at a pre-defined position of the pattern template.

8. The image processing system of claim 7, wherein the fashion apparel is within in a space enclosing the at least four markers; and the imaging device is configured to captured a second image of a second arrangement.

9. The image processing system of claim 8, wherein the size and color determination module is configured to extract a plurality of contour points; wherein the plurality of contour points corresponds to the fashion apparel and the at least four markers.

10. The image processing system of claim 9, wherein the size and color determination module is configured to determine the size of the fashion apparel from the plurality of contour points.

11. A method for determining one or more attributes of a fashion apparel, the method comprising:
    positioning a fashion apparel on top of a pattern template; wherein the pattern template comprises a plurality of patterns;
    capturing an image of the fashion apparel positioned on top of the pattern template;
    extracting a size and a color of the fashion apparel by using the plurality of patterns in the pattern template.

12. The method of claim 11, wherein the plurality of patterns comprises a matrix of dots; wherein each dot is of a pre-defined size and wherein each dot in the matrix of dots is of a pre-defined color.

13. The method of claim 12, wherein the fashion apparel is positioned above the matrix of dots and the imaging device is configured to captured a first image of a first arrangement, wherein the first pattern image comprises a set of occluded dots and a set of visible dots.

14. The method of claim 13, wherein the set of occluded dots is used to determine a size of the fashion apparel and wherein the set of visible dots is used to determine a color of the fashion apparel.

15. The method of claim 11, wherein the plurality of patterns comprises at least four markers, wherein each marker is disposed at a pre-defined position of the pattern template.

16. The method of claim 15, wherein the fashion apparel is positioned within a space enclosing the at least four markers; and the imaging device is configured to capture a second image of a second arrangement.

17. The method of claim 16, further comprising extracting a plurality of contour points from the second image; wherein the plurality of contour points corresponds to the fashion apparel and the at least four markers.

18. The method of claim 17, further comprising determining the size of the fashion apparel from the plurality of contour points.

19. The method of claim 11, further comprising correcting angular errors in the pattern image caused by the orientation of the imaging device relative to the pattern template.

* * * * *